US008752585B2

(12) United States Patent
Buse et al.

(10) Patent No.: US 8,752,585 B2
(45) Date of Patent: Jun. 17, 2014

(54) PRESSURE CONTROL VALVE

(75) Inventors: Werner Buse, Kaarst (DE); Alvito Fernandes, Leverkusen (DE)

(73) Assignee: Pierburg GmbH, Neuss (DE)

(*) Notice: Subject to any disclaimer, the term of this patent is extended or adjusted under 35 U.S.C. 154(b) by 234 days.

(21) Appl. No.: 13/382,292

(22) PCT Filed: May 19, 2010

(86) PCT No.: PCT/EP2010/056891
§ 371 (c)(1),
(2), (4) Date: Jan. 5, 2012

(87) PCT Pub. No.: WO2011/003662
PCT Pub. Date: Jan. 13, 2011

(65) Prior Publication Data
US 2012/0103441 A1 May 3, 2012

(30) Foreign Application Priority Data
Jul. 8, 2009 (DE) .......................... 10 2009 032 374

(51) Int. Cl.
*F16K 11/07* (2006.01)
(52) U.S. Cl.
USPC .............. 137/625.68; 137/627.5; 137/625.65; 137/625.64
(58) Field of Classification Search
USPC ........... 137/529, 627.5, 596.2, 596.1, 625.65, 137/625.69, 625.68, 625.25, 625.64
See application file for complete search history.

(56) References Cited

U.S. PATENT DOCUMENTS

| 1,547,398 | A | * | 7/1925 | Jones ........................ 137/596.1 |
| 4,257,573 | A | * | 3/1981 | Stampfli .................... 251/30.01 |
| 5,771,933 | A | * | 6/1998 | Akamatsu et al. ......... 137/627.5 |
| 6,263,913 | B1 | | 7/2001 | Kussel |
| 6,935,374 | B2 | * | 8/2005 | Yamamoto ................. 137/627.5 |
| 2003/0150498 | A1 | * | 8/2003 | Williams ................. 137/625.65 |
| 2004/0173269 | A1 | * | 9/2004 | Fleischer et al. ......... 137/625.65 |
| 2006/0065315 | A1 | * | 3/2006 | Neff et al. ................ 137/625.65 |
| 2012/0118418 | A1 | * | 5/2012 | Reilly ...................... 137/625.65 |

FOREIGN PATENT DOCUMENTS

| DE | 10 2007 002 153 B3 | | 12/2007 |
| WO | WO 0018382 | * | 4/2000 |
| WO | WO 2008019949 A1 | * | 2/2008 |

* cited by examiner

*Primary Examiner* — Craig Schneider
*Assistant Examiner* — Jessica Cahill
(74) *Attorney, Agent, or Firm* — Norman B. Thot

(57) ABSTRACT

A pressure control valve includes a housing comprising a reference pressure connection, a reference pressure chamber, a preliminary pressure connection, a preliminary pressure chamber, a control pressure connection and a control pressure chamber which are configured to cooperate with a control member moveable in an axial direction within the housing so as to adjust a desired control pressure between a preliminary pressure at the preliminary pressure connection and a reference pressure at the reference pressure connection. A driving device is configured to act on the control member. At least one first sealing device is configured to seal the reference pressure chamber against the control member. At least one second sealing device comprising a second sealing element is configured to seal the preliminary pressure chamber against the reference pressure chamber. At least one third sealing device is configured to seal the control pressure chamber against the preliminary pressure chamber.

18 Claims, 2 Drawing Sheets

PRESSURE CONTROL VALVE

CROSS REFERENCE TO PRIOR APPLICATIONS

This application is a U.S. National Phase application under 35 U.S.C. §371 of International Application No. PCT/EP2010/056891, filed on May 19, 2010 and which claims benefit to German Patent Application No. 10 2009 032 374.0, filed on Jul. 8, 2009. The International Application was published in German on Jan. 13, 2011 as WO 2011/003662 A2 under PCT Article 21(2).

FIELD

The present invention provides a pressure control valve comprising a housing that has a reference pressure connection and a reference pressure chamber, a preliminary pressure connection and a preliminary pressure chamber, and a control pressure connection and a control pressure chamber which cooperate with a control member moveable in the axial direction within the housing, so that a desired control pressure can be adjusted between a preliminary pressure at the preliminary pressure connection and a reference pressure at the reference pressure connection, at least one first sealing device being provided which seals the reference pressure chamber against the control member, at least one second sealing device being provided which seals the preliminary pressure chamber against the reference pressure chamber, and at least one third sealing device being provided which seals the control pressure chamber against the preliminary pressure chamber.

BACKGROUND

DE 10 2007 002 153 B3 describes a pressure control valve wherein at least three sealing devices are provided for sealing the respective chambers against each other. For improving the hysteresis behavior of such a pressure control valve, however, the sealing devices are provided so that, in each instance, a sealing element acting in the axial direction cooperates with a sealing face oriented in the axial direction. Because the sealing devices are arranged substantially in series, leakage may be caused by coaxial springs. In such an embodiment, an open state of the second sealing device may also allow a pressure medium, passing along the control member, to proceed from the preliminary pressure chamber into the interior of reference pressure chamber.

SUMMARY

An aspect of the present invention is to provide a pressure control valve which avoids the above disadvantages and which can be produced in an advantageous manner with a minimum number of component parts.

In an embodiment, the present invention provides a pressure control valve which includes a housing comprising a reference pressure connection, a reference pressure chamber, a preliminary pressure connection, a preliminary pressure chamber, a control pressure connection, and a control pressure chamber. The reference pressure connection, the reference pressure chamber, the preliminary pressure connection, the preliminary pressure chamber, the control pressure connection and the control pressure chamber are configured to cooperate with a control member moveable in an axial direction within the housing so as to adjust a desired control pressure between a preliminary pressure at the preliminary pressure connection and a reference pressure at the reference pressure connection. A driving device is configured to act on the control member. At least one first sealing device is configured to seal the reference pressure chamber against the control member. At least one second sealing device comprising a second sealing element is arranged to be form-locking within at least one of the housing and the control member while being disposed at a distance from the control member in a radial direction. The at least one second sealing device is configured to seal the preliminary pressure chamber against the reference pressure chamber. At least one third sealing device is configured to seal the control pressure chamber against the preliminary pressure chamber]. In this manner, a pressure control valve is provided which combines the advantages of an improved hysteresis behavior with a reliable sealing of the individual chambers against each other.

BRIEF DESCRIPTION OF THE DRAWINGS

The present invention is described in greater detail below on the basis of embodiments and of the drawing in which.

DETAILED DESCRIPTION

In an embodiment of the present invention, the control member can, for example, be of a multi-part design, there being provided a hollow body extending in the longitudinal direction, having on both of its ends a first sealing member of the first sealing device and a third sealing element of the third sealing device. In this manner, there is created a control member which is easily assembled, wherein the reference pressure chamber can be connected to the control pressure chamber via the channel, which is formed as a hollow body, in the control member. The control member can thereby be moved by a valve stem of the drive means/device. The second sealing element is then arranged between the hollow body extending in the longitudinal direction and the first sealing element.

In an embodiment of the present invention, the housing can, for example, comprise a first, a second and a third housing portion. In this configuration, the second sealing element can be arranged between the first and the second housing portion.

In an embodiment of the present invention, the valve stem can, for example, form a sealing face of the first sealing device which is biased against the first housing portion by a first spring means. The second housing portion can, for example, form a sealing face of the third sealing device. In this arrangement, the third sealing element can be biased relative to the third housing portion by a second spring means.

In an embodiment of the present invention, a membrane can, for example, be provided for sealing the driving device against the reference pressure chamber. It can be provided, for example, that said membrane forms the first spring means.

In this arrangement, the second sealing element can, for example, have a suitable bias for replacing the second spring means.

An embodiment of the present invention will be described in greater detail hereunder with reference to FIG. 1, which shows a schematic sectional view of a pressure control valve according to the present invention.

Figure 1:
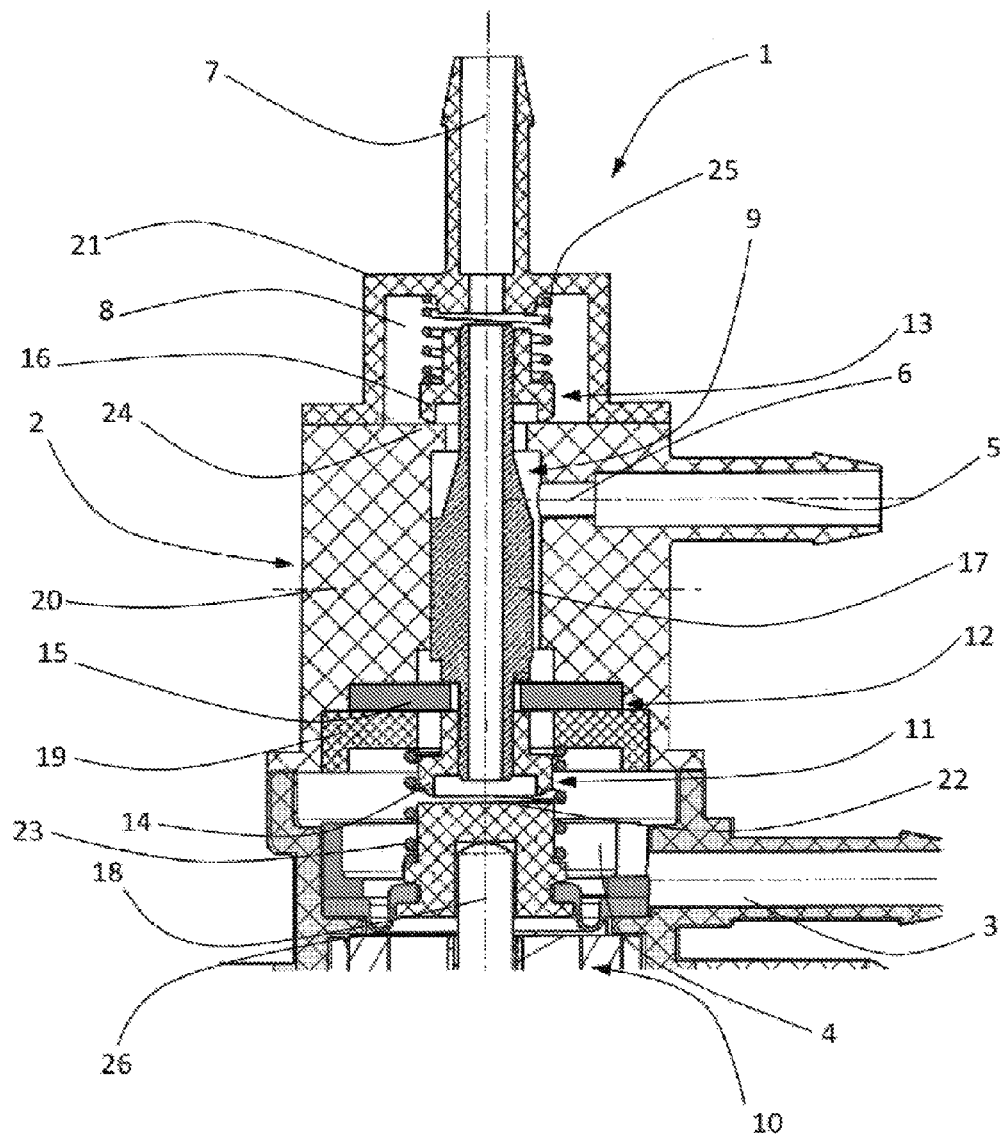
FIG. 1 shows a schematic sectional view of a pressure control valve according to the present invention.

FIG. 1 shows a pressure control valve 1 comprising a housing 2 that has a reference pressure connection 3 and a reference pressure chamber 4, a preliminary pressure connection 5 and a preliminary pressure chamber 6, and a control pressure connection 7 and a control pressure chamber 8. Further arranged in housing 2 is a control member 9 supported for movement in axial direction. By oscillating movement of control member 9, there can be set a desired control pressure which results from the preliminary pressure at the preliminary pressure connection 5 and a reference pressure at the reference pressure connection 3. The minimum control pressure thus corresponds to the reference pressure, which is usually that of the atmosphere, and the maximum control pressure corresponds to the preliminary pressure at the preliminary pressure connection 5.

In this arrangement, a driving device 10 is provided which is operative to act on control member 9. Said driving device 10 is illustrated herein only in a fragmentary manner because it does not play a role for understanding the nature of the present invention. An electromagnetic drive can be provided while, however, other drive means/devices can also be used, such as, for example, pneumatic, electromotoric drive means/devices. In the present case, the valve stem 18 driven by the electromagnetic drive 10 comprises a sealing face 22 which, together with a first sealing element 14, forms a first sealing device. This first sealing device 11 serves to seal the reference pressure chamber against the control member and thus also against the control pressure chamber 8. A second sealing device 12 is also provided which, according to the present invention, comprises a sealing element 15 in the form of a sealing ring, said sealing element being arranged in a form-locking manner both in housing 2 and in control member 9. For safeguarding a good hysteresis behavior, however, this sealing element 15 is radially spaced from control member 9. The second sealing device 12 will provide the sealing of the preliminary pressure chamber 6 against the reference pressure chamber 4 in each operational state of pressure control valve 1. A third sealing device 13 is also provided which substantially comprises a sealing element 16 and an associated sealing face 24.

In the embodiment shown in FIG. 1, the control member 9 is of a multi-part design, there being provided a hollow body 17 extending in the longitudinal direction, comprising on both of its ends the first sealing member 14 and the third sealing element 16.

For reasons inherent in the assembly process, the housing 2 comprises a first housing portion 19, a second housing portion 20 and a third housing portion 21. The radial outward side of the second sealing element 15 can thereby be arranged between the first housing portion 19 and the second housing portion 20, and the radially inward side of the sealing element 15 can be arranged between the hollow body 17 extending in the longitudinal direction and the first sealing element 14. Valve stem 18 is further biased relative to first housing portion 19 via sealing face 22 by a first spring means 23. In a similar manner, third sealing element 16 is biased relative to third housing portion 21 via a second spring means 25. A membrane is further provided for sealing the driving device 10 against the reference pressure chamber 4. It could in fact be provided that the membrane 26 also forms the first spring means 23, so that the spring that is provided here can be omitted.

The operation of the pressure control valve is as follows.

FIG. 1 illustrates the pressure control valve in the non-driven state. With the aid of the second sealing device 12 and the third sealing device 13, the preliminary pressure chamber is sealed against the reference pressure chamber 4 and the control pressure chamber 8. However, the reference pressure chamber 4 is connected to the control pressure chamber 8 via the opened first sealing device 11 and the control member 9, so that, the reference pressure will prevail at the control pressure connection, which in the present case is atmospheric pressure.

When current is supplied to the electromagnetic driving device 10 provided in the present embodiment, the valve stem 18, and thus the sealing face 22, is moved in the direction of control member 9. Upon abutment of sealing face 22 on sealing element 14, reference pressure chamber 4 will be sealed against control pressure chamber 8. Further movement has the effect that the sealing element 16 will be lifted off from sealing face 24 and connect the preliminary pressure chamber 6 to the control pressure chamber 8 so that a medium subjected to the preliminary pressure can enter the control pressure chamber 8. Due to the sealing device 12 and the above-mentioned special embodiment using the sealing element 15, this operational state also provides that the preliminary pressure chamber 6 is sealed against the reference pressure chamber 4. Interruption of the supply of current will have the effect that, with the aid of the first spring means 23 and the second spring means 25, the pressure control device is returned into the initial position, with the reference pressure chamber 4 being connected again to the control pressure chamber 8. By corresponding control of the driving device 10, one can then generally set each control pressure between the reference pressure and the preliminary pressure.

Figure 2:
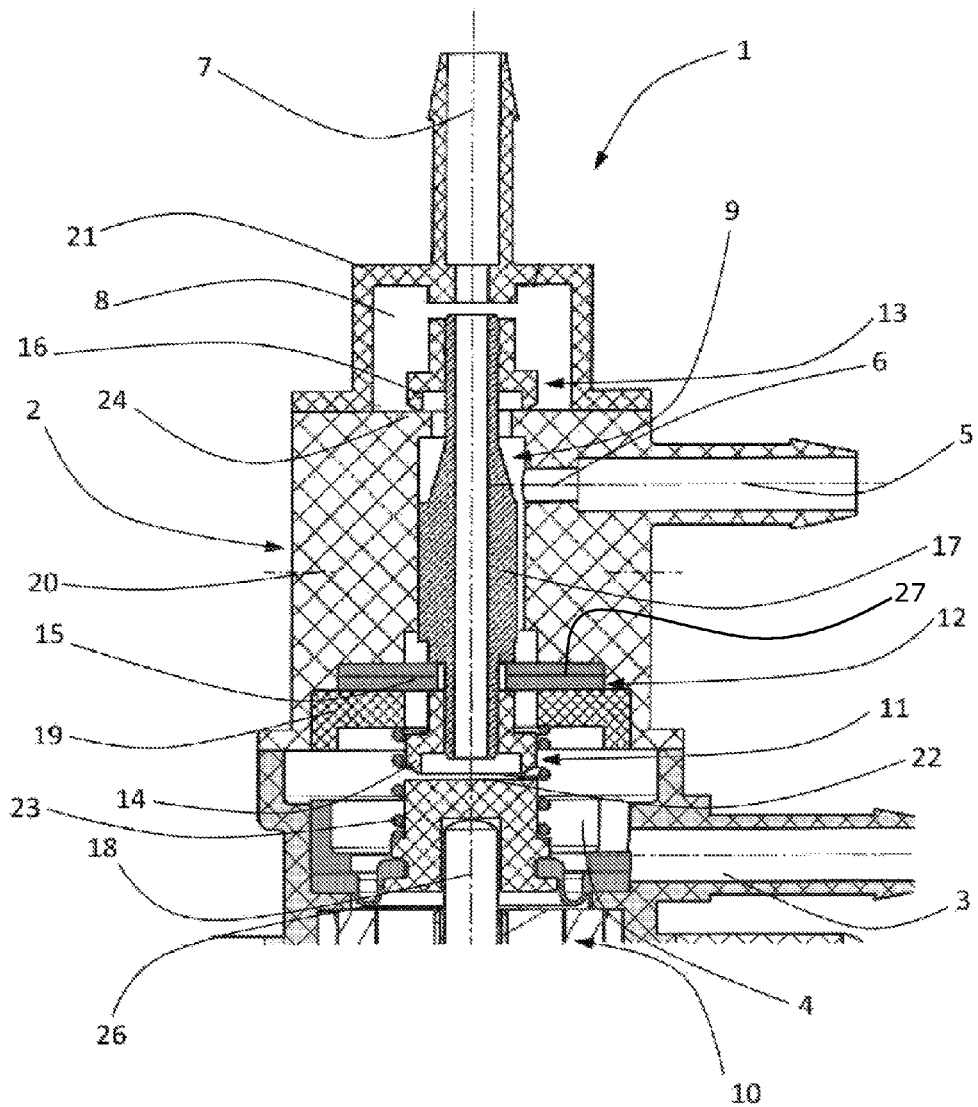
FIG. 2 shows a schematic sectional view of a pressure control valve according to the present invention where the second sealing means 25 if omitted.

A further simplification of the pressure control valve can be achieved, for example, by providing the second sealing element 15 with such a bias 27, as shown in FIG. 2, that the second spring means 25 can be omitted.

The second sealing element 15 can also be arranged in a form-locking manner, for example, either only in the housing 2 or only in the control member 9.

The present invention is not limited to embodiments described herein; reference should be had to the appended claims.

What is claimed is:
1. A pressure control valve comprising:
 a housing comprising:
  a first housing portion,
  a second housing portion,
  a third housing portion,
  a reference pressure connection,
  a reference pressure chamber,
  a preliminary pressure connection,
  a preliminary pressure chamber,
  a control pressure connection, and
  a control pressure chamber, the reference pressure connection, the reference pressure chamber, the preliminary pressure connection, the preliminary pressure chamber, the control pressure connection and the control pressure chamber being configured to cooperate with a control member moveable in an axial direction within the housing so as to adjust a desired control pressure between a preliminary pressure at the preliminary pressure connection and a reference pressure at the reference pressure connection;
 a driving device configured to act on the control member;
 at least one first sealing device comprising a first sealing element, the at least one first sealing device being configured to seal the reference pressure chamber against the control member;
 at least one second sealing device comprising a second sealing element arranged to be form-locking within at least one of the housing and the control member while being disposed at a distance from the control member in a radial direction, the at least one second sealing device being configured to seal the preliminary pressure chamber against the reference pressure chamber;

at least one third sealing device configured to seal the control pressure chamber against the preliminary pressure; and a second spring device, the second spring device being configured to bias a third sealing element against the third housing portion.

2. The pressure control valve as recited in claim 1, wherein the second sealing element is arranged between the first housing portion and the second housing portion.

3. The pressure control valve as recited in claim 1, wherein the second housing portion forms a sealing face of the at least one third sealing device.

4. The pressure control valve as recited in claim 1, wherein the control member comprises a hollow body extending in a longitudinal direction, the hollow body having the first sealing element of the at least one first sealing device on a first end and the third sealing element of the at least one third sealing device on a second end.

5. The pressure control valve as recited in claim 4, wherein the second sealing element is arranged between the hollow body and the first sealing element.

6. The pressure control valve as recited in claim 1, wherein the driving device further comprises a valve stem, the valve stem being configured to move the control member.

7. The pressure control valve as recited in claim 6, further comprising a first spring device, the first spring device being configured to bias the valve stem against the first housing portion, and wherein the valve stem is further configured to form a sealing face of the at least one first sealing device.

8. The pressure control valve as recited in claim 7, further comprising a membrane configured to seal the driving device against the reference pressure chamber.

9. The pressure control valve as recited in claim 8, wherein the membrane is the first spring device.

10. A pressure control valve comprising:
a housing comprising:
a first housing portion,
a second housing portion,
a third housing portion,
a reference pressure connection,
a reference pressure chamber,
a preliminary pressure connection,
a preliminary pressure chamber,
a control pressure connection, and
a control pressure chamber, the reference pressure connection, the reference pressure chamber, the preliminary pressure connection, the preliminary pressure chamber, the control pressure connection and the control pressure chamber being configured to cooperate with a control member moveable in an axial direction within the housing so as to adjust a desired control pressure between a preliminary pressure at the preliminary pressure connection and a reference pressure at the reference pressure connection;

a driving device configured to act on the control member;

at least one first sealing device comprising a first sealing element, the at least one first sealing device being configured to seal the reference pressure chamber against the control member;

at least one second sealing device comprising a second sealing element arranged to be form-locking within at least one of the housing and the control member while being disposed at a distance from the control member in a radial direction, the at least one second sealing device being configured to seal the preliminary pressure chamber against the reference pressure chamber; and at least one third sealing device configured to seal the control pressure chamber against the preliminary pressure chamber, wherein, a bias is provided for the second sealing element, the bias being configured to bias a third sealing element against the third housing portion.

11. The pressure control valve as recited in claim 10, wherein the second sealing element is arranged between the first housing portion and the second housing portion.

12. The pressure control valve as recited in claim 10, wherein the second housing portion forms a sealing face of the at least one third sealing device.

13. The pressure control valve as recited in claim 10, wherein the control member comprises a hollow body extending in a longitudinal direction, the hollow body having the first sealing element of the at least one first sealing device on a first end and the third sealing element of the at least one third sealing device on a second end.

14. The pressure control valve as recited in claim 13, wherein the second sealing element is arranged between the hollow body and the first sealing element.

15. The pressure control valve as recited in claim 10, wherein the driving device further comprises a valve stem, the valve stem being configured to move the control member.

16. The pressure control valve as recited in claim 15, further comprising a first spring device, the first spring device being configured to bias the valve stem against the first housing portion, and wherein the valve stem is further configured to form a sealing face of the at least one first sealing device.

17. The pressure control valve as recited in claim 16, further comprising a membrane configured to seal the driving device against the reference pressure chamber.

18. The pressure control valve as recited in claim 17, wherein the membrane is the first spring device.

* * * * *